United States Patent

[11] 3,580,109

| [72] | Inventor | Franz Hill<br>Friedrichshafen, Germany |
|---|---|---|
| [21] | Appl. No. | 855,137 |
| [22] | Filed | Sept. 4, 1969 |
| [45] | Patented | May 25, 1971 |
| [73] | Assignee | Zahnradfabrik Friedrichshafen<br>Aktiengesellschaft<br>Friedrichshafen, Germany |
| [32] | Priority | Sept. 6, 1968 |
| [33] | | Germany |
| [31] | | Z12082 |

[54] PLANETARY-GEAR TRANSMISSION WITH INTERCONNECTED SUN GEARS AND RING GEARS
4 Claims, 6 Drawing Figs.

[52] U.S. Cl. ............................................... 74/763
[51] Int. Cl. ................................................. F16h 5/30

[50] Field of Search............................................. 74/763

[56] References Cited
UNITED STATES PATENTS

| 2,821,869 | 2/1958 | Kelbel | 74/763 |
| 2,856,794 | 10/1958 | Simpson | 74/763 |
| 2,856,795 | 10/1958 | Simpson | 74/763 |

*Primary Examiner*—C. J. Husar
*Attorney*—Karl F. Ross

ABSTRACT: An automotive transmission with two cascaded planetary gear trains has the two ring gears rigidly connected with each other and with the output shaft, the input shaft being alternately connectable with one planet carrier (forward) or with the two interconnected sun gears (reverse). The driven planet carrier supports two sets of intermeshing planet gears to invert the sense of output-shaft rotation in first and second gear.

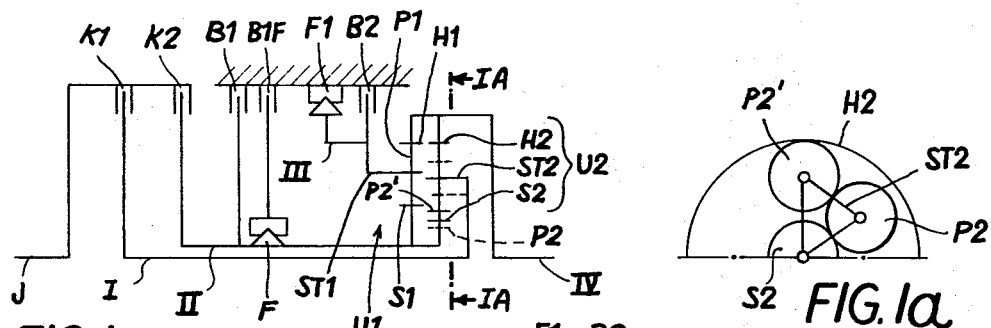
FIG.1 / FIG.1a
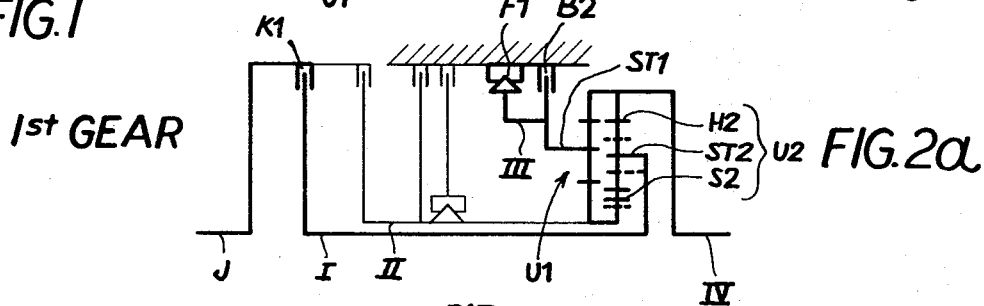
1st GEAR — FIG.2a
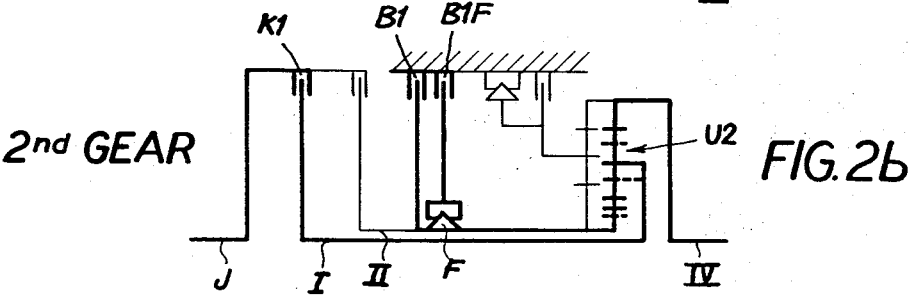
2nd GEAR — FIG.2b
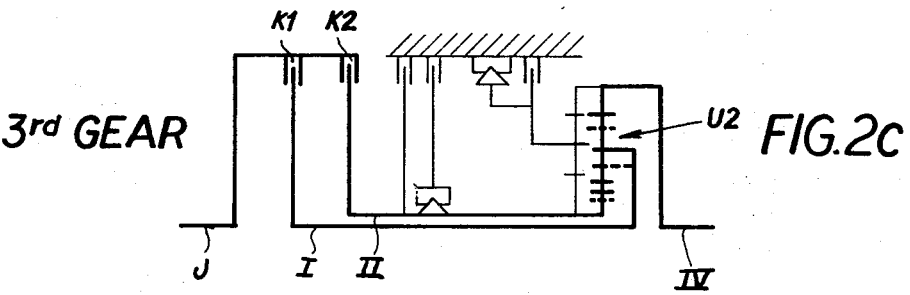
3rd GEAR — FIG.2c
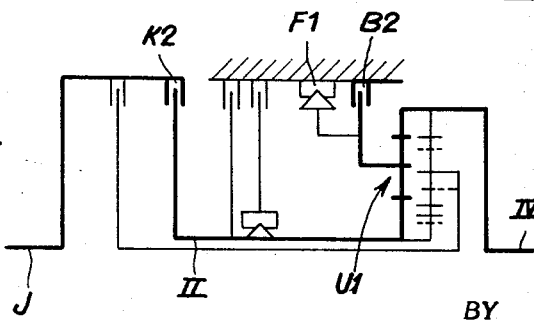
REVERSE — FIG.2d
Franz Hill
INVENTOR.
BY
Karl G. Ross
Attorney

PLANETARY-GEAR TRANSMISSION WITH INTERCONNECTED SUN GEARS AND RING GEARS

My present invention relates to an automotive transmission of the type wherein an input shaft, driven by the vehicular engine (generally with interposition of a fluid coupling), is operatively connectable with an output shaft (leading to the reaction wheels of the vehicle) through a pair of cascaded planetary gear trains with the aid of selectively actuatable clutches and brakes.

In such a system, e.g. as disclosed in U.S. Pat. NO. 2,856,794 to H. W. Simpson, three forward speed ratios or "gears" and one reverse speed ratio can be established by alternatively or jointly coupling the input shaft with two of the six components (two sun gears, two ring gears and two planet carriers) of the two planetary gear trains and by selectively arresting two other components thereof, the establishment of any power train thus requiring the concurrent actuation of two preferably hydraulic coupling elements (clutches and/or brakes). Since the presence of six independently controllable components creates a much larger number of possible power trains than is required in a three-speed transmission, the design of any transmission of this type requires a reduction of the available degrees of freedom by rigidly interconnecting two components of one planetary gear train with two components (not necessarily of the same type) of the other gear train. This leaves four independently rotatable constituents of which one (at least) must be coupled with the input shaft, another must be coupled with the output shaft, and the third must be arrested (or, or direct drive, also joined with the input shaft); the fourth constituent is left floating but will rotate at a speed related to those of the input and output shafts by the dissimilar transmission ratios of the two gear trains. For continuity in shifting between the different forward speeds, it is also desirable to have the input shaft connected to the same component or combination of components in every position than reverse gear.

Even with these restrictions, there are still numerous possibilities of using two clutches and two brakes in the establishment of four power trains commonly used for automotive drives. The number of these possibilities is increased by the fact that either or both planet carriers may support more than one set of planet gears per carrier, the use of two intermeshing plane gears or sets of planet gears not only resulting in a reversal of relative sense of rotation between sun gear and ring gear but also introducing a further ratio-determining parameter. As shown in commonly owned German Pat. No. 1,178,307 , for example, the use of two meshing planetary gears in one gear train enables the omission of the ring gear from the other gear train.

In the aforementioned Simpson patent, the rigidly interconnected components are (a) the two sun gears and (b) the ring gear of the first and the plane carrier of the second planetary gear train; the two clutches serve to connect the input shaft with the second ring gear and/or with the interconnected sun gears, the output shaft being fixedly connected with the first ring gear and therefore also with the second planet carrier.

In commonly owned U.S. application Ser. No. 855,136, filed Sept. 4, 1969 by Anoton Ott, there has been disclosed a system of this general type wherein, for greater compactness, a common planet carrier is used for the two planetary gear trains.

The object of my present invention is to provide a yet further simplified system in which two components of one planetary gear train are integral with corresponding components of the other gear train.

In accordance with my present invention, the two sun gears are rigidly interconnected to form a unitary inner gear structure whereas the two ring gears are joined together to form a unitary outer gear structure; the output shaft is fixedly connected with the outer structure, i.e. with the two ring gears, whereas the input shaft is operatively connectable with one planet carrier by a first clutch and with the inner gear structure, e.e. with the two sun gears, by a second clutch. One of the two planet carriers, preferably the one associated with the first clutch, supports one or more pairs of intermeshing planet gears in driving engagement with the corresponding sun and ring gears, respectively, to invert the sense of rotation of the output shaft at low and intermediate speeds, i.e. when the sun gears are not driven.

To minimize the overall dimensions of the transmission, I prefer to make the radii of the two ring gears substantially identical while assigning different radii to the two sun gears; advantageously, the sun gear associated with the paired planet gears is made of smaller radius to provide the necessary clearance for these planet gears while affording favorable stepdown ratios in the various power trains.

In the detailed description which follows, it will be convenient to distinguish between first and second sun gears as well as between first and second ring gears even though they form part of unitary structures and (e.g. in the case of the ring gears) may be completely merged with each other.

The invention will be described in greater detail with reference to the accompanying drawing in which:

FIG. 1 is a diagrammatic view of a transmission embodying my present improvement;

FIG. 1a is a cross-sectional view taken on line IA–IA of FIG. 1; and

FIGS. 2a, 2b, 2c l and 2d are views similar to FIG. 1 but illustrating the system in four different operating conditions respectively corresponding to the three forward positions and the reverse position of the system of FIG. 1.

In conformity with conventional diagrammatic representation, the drawing shows only those parts of the planetary gear trains which lie above the common axis of the several shafts and gears.

The system comprises an input shaft J driven from an engine shaft via a hydraulic torque converter, not shown, in the manner described in the above-identified Simpson patent and commonly owned German patent specification. Two hydraulic clutches K1, K2 are individually actuatable to couple the shaft J with an intermediate central shaft I or with a surrounding tubular shaft II. Clutch K1 is invariably actuated for each of the three forward speeds (first, second and third gear); clutch K2 is actuated for third gear ("high speed") as well as for reverse drive. For second gear ("intermediate speed"), shaft 11 can be arrested by a first hydraulic brake B1 mounted on the gear housing G, a second such brake B2 being engageable with the body 111 of one of the planet carriers of two planetary gear trains U1, U2 to arrest that carrier for first gear ("low speed") and reverse.

In a manner well known per se, e.g. as described in the above-identified German patent specification, brakes B1 and B2 may be supplemented by overrunning clutches or freewheels for smoother shifting. Thus brake B1 works in parallel with an optional brake B1F, which engages the shaft 11 through a freewheel F and goes into action slightly before brake B1, whereas brake B2 is assisted by a parallel-connected freewheel F1 mounted directly on housing C. These freewheels prevent reverse rotation of shaft 11 and body 111, respectively, which is sufficient for establishment of the corresponding forward speeds but allows the driven shaft IV to outrun its drive; for speed reversal and for slowing a vehicle traveling downhill, a bidirectional braking action is necessary.

The first planetary gear train U1 comprises a sun gear S1 rigid with shaft II, a planet carrier ST1 whose body 111 is arrestable by brake B2 and freewheel F1 as described above, and a ring gear H1 rigid with output shaft IV. The second planetary gear train U2 has a sun gear S2 rigid with sun gear S1 and shaft II, a planet carrier ST2 rigid with shaft I, and a ring gear H2 rigid with ring gear H1 and shaft IV. Planet carrier ST1 supports a single set of planet gears P1 in mesh with sun gear S1 and ring gear H1. Planet carrier ST2 supports two sets of meshing planet gears P2, P2′, only one gear of each set being shown in FIG. 1a; planet gear P2 engages sun gear S2 whereas planet gear P2′ engages ring gear H2.

The four different power trains established by the system of FIG. 1 are shown in heavy lines in FIGS. 2a—2d. In first gear (FIG. 2a) the clutch K1 and the brake B2 are actuated; freewheel F1 is also operative before brake B2 takes effect. With the two sun gears floating, output shaft IV is driven at a transmission ratio determined by the parameters of both gear trains U1, U2.

In second gear (FIG. 2b) clutch K1 is closed, as are brakes B1 and B1F. Output shaft IV rotates at a speed determined exclusively by the parameter of gear train U2, planet carrier ST1 being kept floating.

In third gear (FIG. 2c) the two clutches K1 and K2 operate concurrently to rigidify the gear train U2 whereby shafts J, I, II and IV rotate in unison.

In reverse (FIG. 2d) clutch K2 and brake B2 are actuated; with planet carrier ST2 floating, output shaft IV is driven at a speed determined exclusively by the parameters of gear train U1.

Suitable stepdown ratios in forward and reverse gear are obtained by making the sun gears S1 and S2 different in size while giving substantially indentical radii to ring gears H1 and H2. Specifically, the radius of sun gear S2 is made substantially smaller than that of sun gear S1 whereby, apart from the establishment of a suitable relationship between the stepdown ratios at different speeds, sufficient clearance is provided to accommodate the meshing planet gears P2 and P2'. Although these planet gears have been shown identical in size, this is not essential.

With the stepdown ratios customary in conventional passenger cars and trucks, the speeds of the planet gears will not be greater than four times the speed of input shaft J in any torque-transmitting position.

I claim:
1. An automotive transmission for providing a plurality of speed ratios between an engine-driven input shaft and an output shaft, comprising:
   a first planetary gear train with a first sun gear, a first ring gear and a first planet carrier having a first planet gear in driving engagement with said first sun and ring gears;
   a second planetary gear train with a second sun gear, a second ring gear and a second planet carrier having a pair of intermeshing second planet gears in driving engagement with said second sun gear and said second ring gear, respectively, said second sun gear being coaxial and rigid with said first ring gear and fixedly connected with said output shaft;
   first clutch means actuatable for operatively coupling said input shaft with one of said planet carriers to establish a first, a second and a third forward position;
   second clutch means actuatable for operatively coupling said input shaft with said sun gears to establish the third forward position and a reverse position;
   first brake means actuatable for arresting said sun gears to establish the second forward position;
   and second brake means actuatable for arresting the other of said planet carriers to establish the forward position and said reverse position.

2. A transmission as defined in claim 1 wherein said one of said planet carriers is said second planet carrier.

3. A transmission as defined in claim 2 wherein said first sun gear is of substantially greater radius than said second sun gear.

4. A transmission as defined in claim 3 wherein said ring gears have substantially identical radii.